E. C. READ.
SUSPENSION DEVICE FOR TELEPHONE AND TELEGRAPH CABLES AND OTHER ELECTRICAL CONDUCTORS.
APPLICATION FILED NOV. 25, 1908.

940,555.

Patented Nov. 16, 1909.

Inventor
EMERY C. READ

Witnesses

UNITED STATES PATENT OFFICE.

EMERY C. READ, OF FRANKLIN, PENNSYLVANIA.

SUSPENSION DEVICE FOR TELEPHONE AND TELEGRAPH CABLES AND OTHER ELECTRICAL CONDUCTORS.

940,555.

Specification of Letters Patent. Patented Nov. 16, 1909.

Application filed November 25, 1908. Serial No. 464,446.

*To all whom it may concern:*

Be it known that I, EMERY C. READ, a citizen of the United States, residing at Franklin, in the county of Venango and State of Pennsylvania, have invented certain new and useful Improvements in Suspension Devices for Telephone and Telegraph Cables and other Electrical Conductors, of which the following is a specification.

Figure 1:
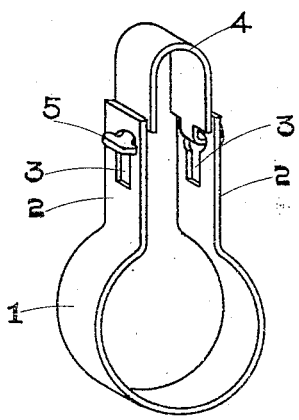
Figure 2:
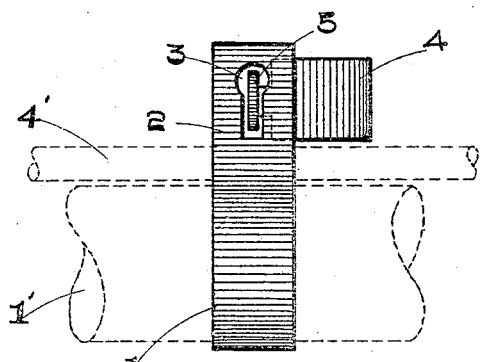
Figure 3:
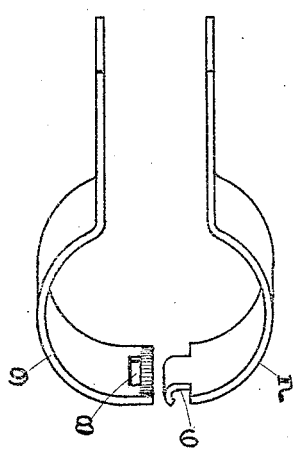
Figure 4:
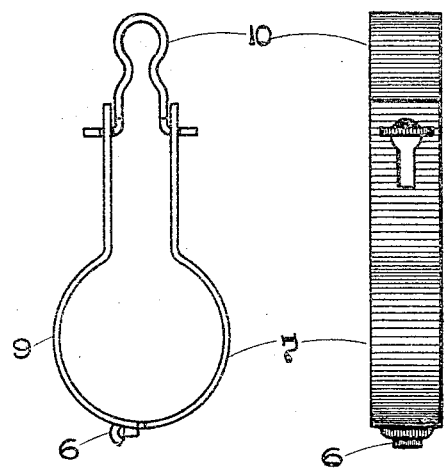
Figure 5:

My invention relates to improvements in suspension devices for telegraph and telephone cables, the object, construction and operation of which are clearly set forth in the following specification, reference being had to the accompanying drawings which form a part hereof and in which:

Figure 1 is a perspective view of my complete device. Fig. 2 is a side view of same,—the component elements being shown in the position in which they are placed when being inter-locked. Fig. 3 is a perspective view of a modified form of the cable-engaging element of my device. Fig. 4 is a front elevation of a complete device embodying said modified form. Fig. 5 is a side elevation thereof.

The same reference numerals indicate identical parts in the several views.

In the construction of telegraph and telephone lines, it has become a very general practice to combine a number of lines or wires into a cable and inclose same in a casing of lead, and when such a cable is suspended upon poles, it becomes necessary to relieve it of the tension due to its own weight by placing above and in close proximity thereto, a suspension-wire from which said cable is supported at close intervals. Heretofore it has been customary to support such cables from the suspension-wire by means of short pieces of wire wrapped around the cable and suspension-wire, and suitably secured in position; other methods have been employed, all of which are more or less inconvenient, and to which there are various objections.

It is, therefore, the object of my invention to provide a simple, easily-applied, cheap, efficient and durable suspension device for the purpose set forth, and the construction whereby I attain this object is substantially as follows: The construction shown in Figs. 1 and 2 is first described, as this is the preferred form.

I provide a suitable cable-clip, composed of metal and conformed at 1 to receive or engage the cable 1'—shown in dotted lines in Fig. 2—the ends 2, 2 of said clip are brought into close proximity to each other and extend upward; through each of said ends, approximate to the extremity thereof, is formed an eye 3, 3, for a purpose which is hereinafter set forth. I also provide a suitable suspension-wire clip 4, composed of metal, conformed to receive or engage the suspension wire 4',—shown also in dotted lines in Fig. 2; said clip 4 is substantially U-shape, the ends thereof being in close proximity to each other and extending downward into juxtaposition to the ends 2, 2, of the cable clip: each end of the wire-clip 4 is formed into an outwardly-extending button 5, 5, which,—when said wire-clip is placed in the position shown in Fig. 2—will pass through the eyes 3, 3, respectively, and when clip 4 is turned to its normal, upright position, as shown in Fig. 1, said buttons extend across and engage the ends 2, 2 respectively of the cable-clip, and thus the juxtaposed ends of the respective clips are securely inter-locked. I do not wish, however, to be understood as confining myself to the particular inter-locking means shown in the drawings, as the drawings, relative to this particular feature, are merely for the purpose of illustrating one way in which my invention may be mechanically or materially expressed.

In Fig. 2 cable 1' and suspension-wire 4' are shown in close proximity to each other, but it will be readily understood that they are normally considerably farther apart than here shown and are brought near together for the purpose of inter-locking the clips.

In Figs. 3, 4 and 5 I have shown a modified form of my invention,—the modification consisting mainly in the construction of the cable clip, which is divided at the bottom, the two parts or members thus formed, being provided with a hinge or uniting device, which consists of a hook 6 formed upon the member 7 and adapted to engage the slot 8 which is formed in member 9. The upper end of each member 7 and 9 is substantially the same as those of the form above described. The wire-clip of the modified form is shaped to conform somewhat more closely to the suspension wire, so that it will grip the same firmly when in position, for the purpose of preventing a creeping of the device longitudinally of the wire, which a vibration of said wire might tend to cause. Said wire-clip 10 is otherwise constructed as above set forth in the description of Fig. 1.

What I claim is:—

In a suspension device for telephone and telegraph cables, the combination with such cable and a suspension wire therefor, of a metallic clip adapted to engage said cable, the ends of said clip being approximately positioned and extending upward, there being a vertically-elongated eye formed in each of said ends, and a metallic clip adapted to engage said suspending wire; each end of said last-mentioned clip being formed into an outwardly-extending, horizontally-disposed button adapted to be engaged with, and disengaged from, said eyes when said wire-clip is turned to a position at a right angle to its normal position.

In testimony whereof I affix my signature in presence of two witnesses.

EMERY C. READ.

Witnesses:
 WM. B. GRIFFEN,
 JOHN L. MCBRIDE.